Patented Nov. 7, 1939

2,178,571

UNITED STATES PATENT OFFICE 2,178,571

ALKYL HYDROXY AROMATIC COMPOUNDS

Lawrence H. Flett, Hamburg, N. Y., assignor to National Aniline & Chemical Company, Inc., New York, N. Y., a corporation of New York No Drawing. Original application July 31, 1934, Serial No. 737,777. Divided and this application July 30, 1936, Serial No. 93,519

29 Claims. (Cl. 260—624)

This invention relates to mixtures of alkyl hydroxy aromatic compounds and to methods of producing them. It relates particularly to mixtures of alkyl hydroxy aromatic compounds of the benzene series.

It is an object of the invention to provide mixtures of alkyl hydroxy aromatic compounds which may be manufactured in a simple and economical manner from easily available starting materials. A further object of the invention is to provide a commercially feasible process for the manufacture of mixtures of alkyl hydroxy aromatic compounds.

Other objects of the invention will in part be obvious, and will in part appear hereinafter.

It has been found in accordance with the present invention that mixtures of alkyl hydroxy aromatic compounds obtainable by processes comprising halogenation of petroleum distillates, preferably consisting predominantly of saturated aliphatic hydrocarbon compounds, condensation of the resulting halogenated products (or selected fractions thereof) with nuclear hydroxy aromatic compounds, followed by rearrangement, if necessary, have considerable value for various purposes.

Thus, it has been found that by chlorinating a petroleum distillate, such as kerosene, liquid petrolatum, and the like, and condensing the chlorination product with a nuclear hydroxy aromatic compound, and particularly with a nuclear hydroxy aromatic compound of the benzene series (such as, for example, phenol, a cresol, cresylic acid, chlorophenol, salicylic acid, and the like), compounds are obtained which may be employed with advantage as intermediates for the production of sulfonation products which are valuable wetting, detergent, emulsifying, and the like, agents. In addition to their use as intermediate products in the manufacture of the sulfonated compounds, the mixtures of alkyl hydroxy aromatic compounds of the present invention may themselves be employed as detergents, for example, in the form of solutions of alcohol-water mixtures containing caustic alkali. Further, they may be employed as insecticides, germicides, parasiticides, or vermicides; as wetting agents in conjunction with emulsifying agents; as assistants in emulsification; as solvents; as intermediates in for the production of resins of all kinds in which phenols are reacted with resin-forming ingredients of various types; as plasticizers for resinous products, cellulose plastics, and other synthetic or natural plastics; and as intermediates for the production of azo dyestuffs, for example, azo dyestuffs soluble in organic solvents, and/or useful for the dyeing of cellulose ethers and esters, etc.

As is well known in the art, petroleum distillates are mainly mixtures of aliphatic hydrocarbons including both saturated acyclic aliphatic hydrocarbons containing straight or branched carbon chains and cyclic aliphatic hydrocarbons as well as some unsaturated aliphatic hydrocarbons, depending upon the petroleum and the method of distillation, and/or purification. The petroleum distillates employed in the preparation of the present invention, however, preferably consist predominantly of saturated acyclic aliphatic hydrocarbons. When the petroleum distillates are halogenated in the preparation of the products of the present invention, mixtures of various halogenated derivatives of the said aliphatic hydrocarbons are produced (which are generically referred to herein as "alkyl halides"), and the said mixtures of the alkyl halides, when condensed with the hydroxy aromatic compounds, produce mixtures of alkyl hydroxy aromatic compounds of the type AHR, in which A represents an aromatic nucleus which may contain substituents, H represents a nuclear hydroxy group, and R represents a nuclear alkyl group containing a relatively large number of carbon atoms, the alkyl groups represented by R corresponding with aliphatic hydrocarbons of the petroleum distillate from which they are produced. (The term "nuclear" as employed herein with reference to a radical means that the radical is linked directly to a carbon atom of an aromatic nucleus represented by A. It appears that when a petroleum distillate of the above described type is subjected to halogenation, the halogen atoms are introduced, in various amounts, into aliphatic hydrocarbon molecules of different structure and into different positions in hydrocarbon molecules of the same structure; so that upon condensing a mixture of said alkyl halides with a nuclear hydroxy aromatic compound, even though the initial aliphatic hydrocarbon is the same, a mixture of nuclear alkyl hydroxy aromatic compounds of varied structure with respect to the alkyl groups in the compounds is produced. Accordingly, the compositions of the present invention are mixtures of alkyl hydroxy aromatic compounds of the type AHR in which the alkyl groups represented by R have varied structures. It has been found that the mixtures of alkyl hydroxy aromatic compounds of this type are superior to a single alkyl hydroxy aromatic compound for many purposes when employed in equivalent amounts.

It will be evident the present invention has the additional important advantage that it provides a relatively simple and direct method of producing products having valuable properties from raw material which is readily available in large quantities, thereby making feasible the economical production of such products on a commercial scale.

In general, mixtures of alkyl hydroxy aromatic compounds of the said type AHR which are obtained from petroleum distillates consisting predominantly of saturated aliphatic hydrocarbon compounds, boiling at temperatures falling within the range of 215° C. at atmospheric pressure and 380° C. at 50 mm. pressure (and which in general contain not less than 12, and not more than 35, carbon atoms in the alkyl group represented by R) are of value, for the various purposes set out above, and, particularly, as intermediate products for the preparation of mixtures of sulfonated products possessing superior detergent, and/or emulsifying action. However, compositions comprising mixtures of alkyl hydroxy aromatic compounds prepared from petroleum distillates containing predominantly saturated aliphatic hydrocarbons containing mainly 12 to 23, or still better 14 to 19 carbon atoms per molecule are of particular interest in accordance with the present invention. Thus, the compositions comprising mixtures of alkyl hydroxy aromatic compounds which are obtained from petroleum distillates having boiling points within the range of about 215° C. at atmospheric pressure to about 260° C. at 50 mm. pressure (which corresponds approximately with 370° C. at atmospheric pressure), and which it is believed contain about 12 to about 23 carbon atoms in the alkyl groups represented by R, and especially those derived from petroleum distillates having boiling points within the range of about 235° C. at atmospheric pressure to about 215° C. at 50 mm. pressure (which corresponds approximately with 320° C. at atmospheric pressure), and which it is believed contain for the most part 14 to 19 carbon atoms in the alkyl groups represented by R, are those with which the present invention is particularly concerned. Preferably, the petroleum distillates subjected to halogenation in the preparation of the products of the present invention should comprise, as the predominant fraction thereof, material boiling within the above noted preferred range of about 235° C. at atmospheric pressure to about 215° C. at 50 mm. pressure.

The aromatic nucleus represented by A in the foregoing formula may be derived from a carbocyclic or a heterocyclic mono-nuclear or polynuclear aromatic compound. It may be free from further substituents, or it may contain one or more additional atoms or groups attached to the carbon or other atoms of the nucleus, such as, for example, one or more additional hydroxyl radicals besides that represented by H in the foregoing formula; one or more additional alkyl groups which may be the same or different; and one or more of the atoms or radicals Cl, Br, I, F, COOH, COOR$_a$, COR$_a$, OR$_a$, and R$_a$ (in which R$_a$ represents any alkyl, aryl, hydroaryl, alkaryl, aralkyl, cycloalkyl, or heterocyclic radical, which groups or radicals may be further substituted or not and, if more than one is present, may be the same or different).

As pointed out above, those products are of particular importance in which the aromatic nucleus represented by A is the residue of a hydroxy aromatic compound of the benzene series, such as, for example, phenol, ortho-, meta-, or para-cresol, cresylic acid, salicylic acid, chlorophenol, and the like.

In preparing the compositions comprising mixtures of alkyl hydroxy aromatic compounds of the present invention, in accordance with one preferred method of procedure, a petroleum distillate of the character described above is chlorinated or otherwise halogenated in accordance with known processes for the production of chlorinated or other halogenated derivatives of aliphatic hydrocarbons, whereby mixtures comprising chlorinated or other halogenated hydrocarbon derivatives are produced; and a hydroxy aromatic compound of the said type AH is then converted to a mixture of alkyl hydroxy aromatic compounds of the said type AHR by a process including reaction of the hydroxy aromatic compound with the chlorinated or other halogenated derivatives, or with a selected portion thereof.

The invention will be illustrated by the following specific examples, but it will be realized by those skilled in the art that the invention is not limited thereto, except as indicated in the appended patent claims. The parts are by weight, the temperatures are in degrees centigrade, and the pressure is atmospheric pressure, unless otherwise indicated.

*Example 1*

*Part 1.*—Chlorine is passed into 328 parts of a kerosene (a Pennsylvania petroleum distillate) which boils from 235° to 240° while maintaining the temperature at 50°. To facilitate the reaction, the reaction mixture, which is contained in a glass reaction vessel, is subjected to direct sunlight during the treatment with chlorine and is well agitated. When the weight of the reaction mixture has increased about 58 parts, the introduction of chlorine is discontinued and the agitation continued for about an additional fifteen minutes. The reaction mixture is subjected to fractional distillation, and a middle fraction is collected between 165 and 175° at 34 mm. pressure of mercury. It comprises mainly monochlorinated hydrocarbons.

*Part 2.*—150 parts of the resulting chlorinated hydrocarbon product, 150 parts of phenol and 130 parts of anhydrous zinc chloride are agitated while being heated at 170° in a vessel provided with a reflux condenser. After about five hours, the heating is discontinued, the mixture is allowed to cool, is washed with dilute hydrochloric acid (100 parts of 10 per cent HCl), and is then distilled at 4 mm. pressure. The portion of the product boiling from 140° to 250° at 4 mm. pressure is separately collected, about three-fourths of which boils between 175° and 220°. The product is comprised mainly of a mixture of alkyl phenols which may be represented by the general formula:

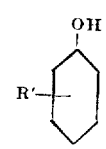

in which R' is a primary, secondary or tertiary alkyl group, which for the most part is probably in the para-position to the hydroxyl group, the average number of carbon atoms in the groups represented by R' probably being about 14.

*Example 2*

Chlorine is passed into 400 parts of a kerosene boiling from about 195° to about 300° (and boiling for the most part from about 225° to 275°), having a specific gravity of 0.799 at 24°, containing about 5.6 per cent of unsaturated hydrocarbons, and having a probable carbon content ranging from 11 to 18 carbon atoms and a probable average content of about 13.4 carbon atoms, at 50° in diffused light until there is an increase of weight of 111 parts, 2 parts of which is due to dissolved hydrogen chloride. The resulting product comprises unchlorinated hydrocarbon in admixture with mono-, di-, and poly-chlorinated hydrocarbons, the average chlorine content of the mixture being equivalent to about one and one-half atoms of chlorine per molecule of hydrocarbon having the stated carbon content. 150 parts of this chlorinated mixture is slowly added to an agitated mixture of 200 parts phenol and 5 parts anhydrous zinc chloride at 75°, and the temperature is maintained at 75° for about 30 minutes after all the chlorinated mixture has been added. The temperature of the mixture is then raised and maintained at 135° for 2.5 hours. 5 parts of zinc dust is then added, and after one hour another 5 parts of zinc dust is added, the temperature being maintained during this addition, and for about 3 hours afterward, at 135°. The reaction mixture is cooled, treated with water, and the oil is separated from the water and residual zinc dust and fractionally distilled. The fraction boiling from 140° to 250° at 4 mm. pressure is separately collected. It comprises a mixture of saturated and unsaturated alkyl phenols and chloralkyl phenols, the alkyl groups containing a probable average content of about 13 carbon atoms.

*Example 3*

Part 1.—A crude chlorinated kerosene is prepared by chlorinating at 50°, in a lead-lined vessel, a kerosene of the type employed in Example 2, until the reaction mixture reaches a specific gravity of 0.91.

Part 2.—150 parts of the product of Part 1 of this example are reacted with 200 parts of phenol as described in Example 2. The crude product is washed with water and distilled in vacuo. The fraction distilling from 140° to 240° at 3 mm. pressure is separately collected. It comprises a mixture of alkyl phenols in which the alkyl groups have a probable average content of 13 carbon atoms. The alkyl groups are probably for the main part saturated alkyl hydrocarbon groups.

*Example 4*

Chlorine is passed into 300 parts of a purified petroleum oil distillate known commercially as "white oil" which boils from 210° to 285° at 25 mm. pressure and has a probable average composition corresponding with the empirical formula $C_{23}H_{48}$, the procedure and reaction conditions being the same as those in Example 1, Part 1. The introduction of chlorine is discontinued when the reaction mixture has increased in weight about 33 parts, about 1.5 hours being required, and the agitation is continued thereafter for about fifteen minutes. (The increase in weight of about 33 parts corresponds substantially with the theoretical increase in weight for the formation of the monochloride.) 200 parts of the resulting chlorinated white oil, 200 parts of phenol and 35 parts of anhydrous zinc chloride are heated and refluxed at 170° for about 5 hours in the manner described in Example 1, Part 2. The oily product is decanted from the zinc chloride and is fractionally distilled in vacuo. The distillate boiling from 240° to 300° at 3 mm. pressure is separately collected. It comprises a mixture of alkyl phenols in which the alkyl groups have a probable average content of about 23 carbon atoms.

*Example 5*

Chlorine is passed into 600 parts of a commercial petroleum distillate boiling from 240° to 364° and assumed to have an average composition represented by the empirical formula $C_{17.3}H_{36.6}$, the procedure and reaction conditions being the same as those in Example 1, Part 1. When an increase in weight of about 88 parts takes place, which usually requires about 3 hours and which corresponds substantially with the theoretical increase in weight for the formation of the monochloride, the introduction of chlorine is discontinued but the agitation is continued for an additional fifteen minutes. 200 parts of the resulting chlorinated kerosene, 125 parts of phenol and 35 parts of anhydrous zinc chloride are refluxed for 5 hours. The oily product is decanted from the zinc chloride and is fractionally distilled in vacuo. The distillate boiling from 190° to 275° C. at 4 mm. pressure is separately collected. It is comprised chiefly of a mixture of alkyl phenols wherein the average number of carbon atoms in the alkyl groups is probably about 17.

*Example 6*

200 parts of the crude, undistilled, chlorinated hydrocarbon product of Example 3, Part 1, 125 parts of phenol and 25 parts of zinc dust are heated under refluxing and agitation at 170° for about 4 hours. The oily product is decanted from the zinc residues and fractionally distilled in vacuo. The portion of the distillate boiling from 160° to 250° at 4 mm. pressure is separately collected. It is similar to the product resulting from the process of Example 3.

*Example 7*

150 parts of the chlorinated hydrocarbon product prepared in Example 3, Part 1, 150 parts of phenol, 130 parts of anhydrous zinc chloride and 10 parts of tetrachlorethane are heated under refluxing and agitation at 140° to 150° for about 3½ hours, an additional 10 parts of tetrachlorethane being added after the reaction has proceeded for about 2 hours. The oily reaction mixture is decanted from the zinc chloride, washed with 10 per cent hydrochloric acid and fractionally distilled in vacuo. The portion of the distillate boiling from 180° to 240° at 10 mm. pressure is separately collected. It is similar to the product resulting from the process of Example 3.

*Example 8*

Chlorine is passed into 300 parts of kerosene (boiling from about 210° to about 255°, and for the most part from about 220° to 240°) at 5° to 15° until there is a gain in weight of 58 parts, exclusive of the small amount of dissolved hydrogen chloride present. 150 parts of the resulting chlorinated kerosene, 70 parts of commercial cresylic acid and 25 parts of anhydrous zinc chloride are agitated vigorously and heated at 135° for 45 minutes. After cooling, the liquid is decanted from the solid material and washed with about 100 parts of 10 per cent hydrochloric acid. The washed oil is vacuum distilled, and the fraction of the distillate boiling between 190° and 240° at 8 mm. pressure is separately collected. It is an amber to white liquid and is comprised chiefly of a mixture of alkyl cresols corresponding with the general formula:

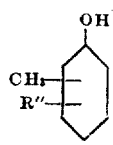

in which $R''$ is a primary, secondary or tertiary alkyl group and in which the alkyl groups represented by $R''$ have a probable average content of 12 to 15 carbon atoms.

Example 9

100 parts of the chlorinated hydrocarbon products prepared in Example 2, 100 parts of p-cresol and 80 parts of anhydrous zinc chloride are heated under refluxing and agitation, as described in Example 1, Part 2, for about 4 hours. The oily product is decanted from the zinc chloride, washed with dilute hydrochloric acid and fractionally distilled in vacuo. The portion of the distillate boiling from 190° to 210° at 7 mm. pressure is separately collected. It comprises mainly a mixture of alkyl p-cresols which may be represented by the general formula:

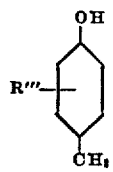

in which $R'''$ is a primary, secondary or tertiary alkyl group, probably mostly in ortho-position to the hydroxyl group, the average number of carbon atoms in the alkyl groups represented by $R'''$ probably being about 13.

Example 10

100 parts of m-cresol are employed instead of the p-cresol of Example 9. The portion of the resulting product boiling from 185° to 205° at 6 mm. pressure is separately collected. It comprises mainly a mixture of alkyl m-cresols which may be represented by the general formula:

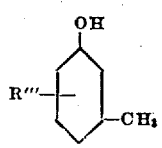

in which $R'''$ is a primary, secondary or tertiary alkyl group, the said alkyl groups having a probable average content of about 13 carbon atoms.

Example 11

150 parts of the crude, undistilled chloride of Example 1, Part 1, 20 parts of anhydrous zinc chloride and 100 parts of o-cresol are heated to 135° for 10 hours, the resulting oil decanted off and distilled. The portion of the resulting product boiling from 160° to 250° at 4 mm. pressure is separately collected. It comprises mainly a mixture of alkyl o-cresols which may be represented by the general formula:

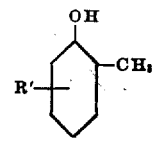

in which $R'$ is a primary, secondary or tertiary alkyl group, the said alkyl groups having a probable average content of about 14 carbon atoms.

Example 12

Chlorine is passed into 300 parts of kerosene (boiling from about 210° to 255° and for the most part from about 220° to 240°) at 5° to 15° until there is a gain in weight of 58 parts exclusive of the dissolved hydrogen chloride. 150 parts of the chlorinated kerosene, 80 parts of o-chlorophenol and 40 parts of anhydrous zinc chloride are agitated vigorously and heated at 135° for 45 minutes. The liquid is decanted from the solid and washed once with about 100 parts of 10 per cent hydrochloric acid. The oil is vacuum distilled. The fraction boiling between 180° and 250° at 8 mm. pressure is collected separately. It is a brown to white liquid comprised chiefly of a mixture of alkyl o-chlorophenols corresponding with the general formula:

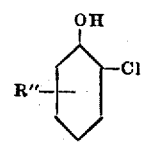

in which $R''$ has the meaning above given in Example 8.

Example 13

Chlorine is passed into 300 parts of kerosene (boiling from about 210° to 255° and for the most part from about 220° to 240°) at 5° to 15° until there is a gain in weight of 58 grams exclusive of the dissolved hydrogen chloride. 150 parts of the chlorinated kerosene, 90 parts of salicylic acid and 50 parts of anhydrous zinc chloride are agitated vigorously and heated at 140° to 150° for 4 hours. When the reaction mixture cools to 80°, 100 parts of water are added, and then about 70 parts of ether. The zinc chloride is removed by washing several times with water. The ether solution is extracted with sodium carbonate solution. The sodium carbonate solution is boiled to remove any dissolved ether, acidified with hydrochloric acid and heated. The excess salicylic acid dissolves and leaves the alkyl salicylic acid as an oil. The crude alkylated salicylic acid when cold is a brown, gummy solid. It forms a good detergent with alkali.

Example 14

800 parts of the chlorinated hydrocarbon product employed in Example 1, Part 2, 400 parts of crude pyrogallol and 50 parts of zinc chloride are agitated and heated in a container at 160° for 17 hours. The oily product is decanted from the hard residue which has formed, and distilled in vacuo. The portion of the distillate boiling from 220° to 260° at 3 mm. pressure is separately collected. It comprises mainly a mixture of alkyl pyrogallols which may be represented by the general formula:

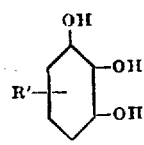

in which R' is a primary, secondary or tertiary alkyl group, the said alkyl groups having an average content of probably about 14 carbon atoms.

*Example 15*

A crude chlorinated kerosene is prepared as described in Example 1, Part 1, from a kerosene which boils from about 195° to 300°. It is fractionally distilled and the fraction boiling from 120° to 160° at 8 mm. pressure is separately collected. 200 parts of this fraction are mixed with 150 parts of 8-hydroxyquinoline, and to this mixture, with agitation, there are slowly and cautiously added 150 parts of anhydrous aluminum chloride. 50 parts of tetrachlorethane are added, and the mixture carefully heated. A vigorous reaction develops which is controlled, if necessary, by cooling the reaction mixture. After the reaction has moderated, the reaction mass is maintained at a temperature of 90° for 3 hours, the mixture is poured onto ice, acidified with hydrochloric acid, and the oil which separates is washed with dilute caustic soda solution and distilled. The fraction which distills over at 200° to 230° at 3 mm. pressure is separately collected. The product thus obtained comprises an alkylated hydroxy-quinoline having the following general formula:

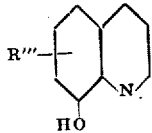

wherein R''' is a primary, secondary or tertiary alkyl group which probably contains an average of 13 to 15 carbon atoms.

*Example 16*

A mixture of 300 parts of the chlorinated hydrocarbon prepared in Example 3, Part 1, 200 parts para-hydroxydiphenyl and 35 parts of anhydrous zinc chloride is heated under a reflux condenser to refluxing temperature, with agitation, for 7 hours. The mixture is cooled, a sufficient amount of ether and alcohol (equal parts) is added to dissolve the solid organic material which is present, and the alcohol-ether solution is washed with water and distilled in vacuo. The portion boiling from 230° to 300° at 5 mm. pressure is separately collected. It is comprised of a mixture of alkyl p-hydroxydiphenyls in which the average content of the alkyl group is probably about 13 carbon atoms.

*Example 17*

Chlorine is passed into 300 parts of kerosene (a South Texas petroleum distillate) boiling from 185° to 281°, having a specific gravity of 0.823 at 24°, an average composition probably corresponding to $C_{12.5}H_{27}$, and containing 1 per cent of unsaturated hydrocarbon. The kerosene which is contained in a glass vessel is maintained at a temperature of about 25° to 40° and subjected to diffused daylight for 2 hours, and then is maintained at 50° while subjected to actinic light from a mercury lamp for an hour or until the reaction mixture has increased about 59 parts in weight (which corresponds approximately to monochlorination). A mixture of 300 parts of this chlorinated kerosene, 150 parts of phenol and 25 parts of anhydrous zinc chloride is heated, with agitation, to 135° for 10 hours; the reaction mixture is cooled and then washed with water, and the oily residue is distilled in vacuo. The fraction distilling from 150° to 250° at 4 mm. pressure is separately collected. It comprises an alkyl phenol mixture in which the alkyl groups have a probable average content of about 12 to 13 carbon atoms.

*Example 18*

420 parts of bromine dissolved in 1600 parts of carbon tetrachloride are slowly added in small portions at a time to 500 parts of kerosene of the type employed in Example 2 contained in a glass vessel, at ordinary temperature in the presence of actinic light from a mercury lamp. The resulting crude product, after distilling off the carbon tetrachloride, comprises a mixture of brominated hydrocrabons. 108 parts of this crude product is mixed with 75 parts of phenol and 10 parts of anhydrous zinc chloride, and the mixture is heated at 135° for 4 hours. The resulting mass is cooled, washed with water, and distilled under reduced pressure. The fraction distilling between 140° and 205° at 4 mm. pressure is separately collected. It comprises a mixture of alkyl phenols in which the alkyl groups have a probable average content of about 13 carbon atoms.

*Example 19*

Part 1.—Chlorine is passed into a kerosene (a purified Pennsylvania petroleum distillate (boiling from 245° to 315°, and of which 90 per cent distills between 260° and 305°, and having a specific gravity of 0.815, contained in a closed, lead-lined vessel which is equipped with a vent for hydrogen chloride produced by the chlorination. The chlorination is carried out in the dark, but to facilitate the chlorination the kerosene initially contains about 0.45 part of iodine per 1000 parts of kerosene. The temperature of the reaction mass is preferably maintained at about 45° to 50°. The introduction of chloride is continued until the weight of the mass increases to an extent corresponding substantially with 115 per cent of the theoretical amount for the formation of the monochloride. The specific gravity of the reaction mixture reaches about 0.915.

Part 2.—560 parts of the resulting mixture of chlorinated hydrocarbons, 350 parts of phenol and 28 parts of granular anhydrous zinc chloride are agitated at room temperature for about 3 hours and then heated, with agitation, at about 135° for about 5 hours. The resulting reaction mass is cooled and added to about 600 parts of water, the mixture is heated to 70° with agitation, allowed to settle, and the upper, oil layer is separated and washed with hot water to remove zinc chloride and residual phenol. The washed oil is then treated with a small amount of alkali (7 parts of a 50 per cent solution of sodium hydroxide) and distilled in vacuo (e. g., 4 mm. pressure) in a still equipped with a fractionating column. Fractions boiling between about 140° and 230° at 4 mm. pressure are collected as separate products or as one product.

It will be realized by those skilled in the art that changes may be made in the products, and in the processes of preparing and using them, hereinbefore described, without departing from the scope of the invention.

Thus, the mixed alkyl hydroxy aromatic compounds of the said type AHR may be prepared in various ways from various fractions of petroleum distillates, preferably consisting predominantly of saturated aliphatic hydrocarbon compounds. The most important sources of raw material for the preparation of the alkyl hydroxy aromatic compounds are the kerosene fractions derived from paraffinic and/or asphaltic petroleums as, for example, those obtained from Pennsylvania, Texas, or Oklahoma petroleums, those obtained from Pennsylvania petroleum being especially preferred.

As will be evident from the foregoing examples, the invention includes products prepared from various fractions of petroleum distillates and boiling over a wide or narrow range of temperatures. For general use, the products are prepared from kerosene fractions of wide boiling range. For individual purposes, preferred products are obtained by employing as initial material a kerosene fraction of narrow boiling range. The use of fractions of petroleum distillates of relatively small boiling range has the advantage of facilitating the separation by distillation of the free phenol, free hydrocarbon and alkyl phenol from each other, or of the halogenated hydrocarbons from residual unhalogenated hydrocarbons. As hereinabove pointed out, for most purposes, and particularly as intermediate products for the preparation of sulfonated products useful as detergents, products are preferred which are derived from petroleum distillates consisting predominantly of saturated aliphatic hydrocarbons having a carbon content of 12 or more carbon atoms, and particularly 12 to 23 carbon atoms, and boiling for the most part between about 215° C. at atmospheric pressure and about 260° C. at 50 mm. pressure.

The chlorination of the petroleum hydrocarbon may be carried out by any well-known process. The approximate extent of chlorination may be determined by the increase in the weight of the hydrocarbon material chlorinated, or by the increase of the specific gravity of the mixture. Various chlorination temperatures may be employed, for example, temperatures within the range 0° to 70° C., and preferably in the neighborhood of 50° C. If desired, or necessary, the chlorination may be carried out with the aid of chlorine carriers, catalysts, or adjuvants, as, for example, phosphorus trichloride, iodine, sunlight, etc.

In general, the extent of chlorination of the petroleum hydrocarbon may be regulated by a weight increase corresponding to a product containing a ratio of about 0.25 to 2.5 atoms of chlorine per molecule of hydrocarbon, about 1.1 to 1.5 atoms being preferred, but it will be understood that other ratios may be used. Ordinarily, the greater the amount or extent of chlorination, the greater is the amount of high boiling residues obtained. In general, the monochloride boils about 15° to 20° C. higher than the petroleum distillate from which it is derived. If desired, the chlorinated products may be fractionally distilled so as to obtain a further selection and restriction of alkyl compounds having a selected content of chlorine atoms. Instead of chlorine, other halogens may also be employed in effecting halogenation; e. g., bromine, etc.

The condensation of the halogenated hydrocarbon with the hydroxy aromatic compound may be carried out with the aid of other condensing agents than zinc chloride; as, for example, metals (such as zinc or iron), other metal halides (such as, anhydrous aluminum chloride, anhydrous ferric chloride), etc. In general, however, anhydrous zinc chloride is the preferred condensing agent since, on the whole, it gives a more uniform product and better yield.

The proportion of mixed alkyl halides with respect to the hydroxy aromatic compound employed in the preparation of the alkylated hydroxy aromatic compounds may be varied. Preferably, the proportion of mixed halogenated hydrocarbons employed with respect to the hydroxy aromatic compound is such that only one alkyl radical of the type represented by R in the foregoing formula is contained in the resulting alkyl hydroxy aromatic compounds. Thus, at least 1.75 mols of hydroxy aromatic compound per mol of mixed halogenated hydrocarbons is preferably employed in the condensation. A molar ratio as low as 1 to 1 may be employed, but the yield of the resulting alkyl hydroxy aromatic compounds containing one long alkyl group will be less. Further, the amount of condensing agent employed may vary over a wide range. For example, in using anhydrous zinc chloride as the condensing agent, in some cases, as low as 1 per cent and in others about 5 to 10 per cent or more by weight of anhydrous zinc chloride, based upon the amount of halogenated petroleum hydrocarbon, may be employed. The condensation reaction may be carried out at any suitable temperature. However, when a zinc chloride condensing agent is employed, temperatures between 60° and about 180° C. are ordinarily preferred.

The duration of the condensation treatment may also be varied, the particular period of condensation being dependent to some extent upon the condensation temperature employed as well as the particular condensing agent used and the nature of the desired product. The condensation is ordinary complete in about 1 hour at refluxing temperature (approximately 170° C. for phenol), or in about 3 to 6 hours at about 135° C., when employing a metal halide condensing agent. With anhydrous zinc chloride as the condensing agent, the period of heating may be extended to 16 hours or more without seriously harming the quality or substantially decreasing the yield of alkyl hydroxy aromatic compounds.

The mixtures of alkyl hydroxy aromatic compounds may also be prepared in other ways. Thus, the mixed alkyl halides resulting from halogenation of the selected fraction of petroleum distillate may be reacted with an alkali metal phenolate or other metal compound of the hydroxy aromatic compound desired to be alkylated, to form a mixture of alkyl ethers of said hydroxy aromatic compound, and the resulting ether mixture may be subjected to rearranging treatment according to processes similar to those used for rearrangement of known alkyl ethers of phenols, to convert the said ethers to the corresponding alkyl hydroxy aromatic compounds.

Mixtures of hydroxy aromatic compounds of the said type AH may be employed as reacting ingredients, if desired; as, for example, naturally occurring mixtures such as commercial cresylic acid, or artificially prepared mixtures of two or more of said hydroxy aromatic compounds.

The alkyl hydroxy aromatic compounds may be purified by fractional or steam distillation, or by other suitable processes.

Since certain changes may be made in the above processes and products without departing from the scope of the present invention it is intended that all matter contained in the above description shall be interpreted as illustrative and not in a limiting sense.

This application is a division of my application Serial No. 737,777, filed July 31, 1934, which is a continuation-in-part of my applications Serial Nos. 691,081 and 691,082 filed September 26, 1933.

I claim:

1. A mixture of alkyl hydroxy aromatic compounds of the type AHR which mixture is obtainable by the halogenation of a petroleum distillate consisting predominantly of saturated aliphatic hydrocarbons, to form mixed alkyl halides, and conversion of a hydroxy aromatic compound of the type AH to a mixture of alkyl hydroxy aromatic compounds of the type AHR by a process including reaction thereof with resulting mixed alkyl halides; A representing an aromatic nucleus, H representing a nuclear hydroxyl group, and R representing an alkyl group containing at least 12 carbon atoms.

2. A mixture of alkyl hydroxy aromatic compounds of the type AHR which mixture is obtainable by the halogenation of a petroleum distillate consisting predominantly of saturated aliphatic hydrocarbons, to form mixed alkyl halides, and conversion of a hydroxy aromatic compound of the type AH to a mixture of alkyl hydroxy aromatic compounds of the type AHR by a process including reaction thereof with resulting mixed alkyl halides; A representing an aromatic nucleus, H representing a nuclear hydroxyl group, and R representing an alkyl group containing from 12 to 23 carbon atoms.

3. A mixture of alkyl hydroxy aromatic compounds of the type AHR which mixture is obtainable by the halogenation of a petroleum distillate consisting predominantly of saturated aliphatic hydrocarbons, to form mixed alkyl halides, and conversion of a hydroxy aromatic compound of the type AH to a mixture of alkyl hydroxy aromatic compounds of the type AHR by a process including reaction thereof with the resulting mixed alkyl halides; A representing an aromatic nucleus, H representing a nuclear hydroxyl group, and R representing an alkyl group containing from 14 to 19 carbon atoms.

4. A mixture of alkyl hydroxy aromatic compounds of the type AHR which mixture is obtainable by the chlorination of a petroleum distillate boiling within the range about 215° C. at atmospheric pressure and about 380° C. at 50 mm. pressure, and consisting predominantly of saturated aliphatic hydrocarbons, to form mixed alkyl chlorides, and conversion of a hydroxy aromatic compound of the type AH to a mixture of alkyl hydroxy aromatic compounds of the type AHR by a process including reaction thereof with resulting mixed alkyl chlorides; A representing an aromatic nucleus of the benzene series, H representing a nuclear hydroxyl group, and R representing an alkyl group.

5. A mixture of alkyl hydroxy aromatic compounds of the type AHR which mixture is obtainable by the chlorination of a petroleum distillate boiling within the range of about 215° C. at atmospheric pressure and about 260° C. at 50 mm. pressure, to form mixed alkyl chlorides, and conversion of a hydroxy aromatic compound of the type AH to a mixture of alkyl hydroxy aromatic compounds of the type AHR by a process including reaction thereof with resulting mixed alkyl chlorides; A representing an aromatic nucleus of the benzene series, H representing a nuclear hydroxyl group, and R representing an alkyl group.

6. A mixture of alkyl hydroxy aromatic compounds of the type AHR which mixture is obtainable by the chlorination of a petroleum distillate boiling within the range of about 215° C. at atmospheric pressure and about 260° C. at 50 mm. pressure, to form mixed alkyl chlorides, and conversion of a hydroxy aromatic compound of the type AH to a mixture of alkyl hydroxy aromatic compounds of the type AHR by a process including reaction thereof with resulting mixed alkyl chlorides; A representing an aromatic nucleus of the benzene series, H representing a nuclear hydroxyl group, and R representing an alkyl group; said mixture containing a plurality of compounds of the said type AHR in some of which the alkyl group represented by R is unsaturated and in others of which it is saturated.

7. A mixture of alkyl hydroxy aromatic compounds of the type AHR which mixture is obtainable by the chlorination of a petroleum distillate boiling within the range of about 215° C. at atmospheric pressure and about 260° C. at 50 mm. pressure, to form mixed alkyl chlorides, and conversion of a hydroxy aromatic compound of the type AH to a mixture of alkyl hydroxy aromatic compounds of the type AHR by a process including reaction thereof with resulting mixed alkyl chlorides; A representing an aromatic nucleus of the benzene series, H representing a nuclear hydroxyl group, and R representing an alkyl group; said mixture containing a plurality of compounds of the said type AHR in some of which the alkyl group represented by R is a chloralkyl group.

8. A mixture of alkyl hydroxy aromatic compounds of the type AHR which mixture is obtainable by the chlorination of a petroleum distillate boiling within the range of about 215° C. at atmospheric pressure and about 260° C. at 50 mm. pressure, to form mixed alkyl chlorides, and conversion of a hydroxy aromatic compound of the type AH to a mixture of alkyl hydroxy aromatic compounds of the type AHR by a process including reaction thereof with resulting mixed alkyl chlorides; A representing an aromatic nucleus of the benzene series, H representing a nuclear hydroxyl group, and R representing an alkyl group; said mixture containing a plurality of compounds of the said type AHR in some of which the alkyl group represented by R is unsaturated and in others of which it is saturated and in others of which it is a chloralkyl group.

9. A mixture of alkyl hydroxy aromatic compounds of the type AHR which mixture is obtainable by the chlorination of a Pennsylvania petroleum distillate boiling within the range about 235° C. at atmospheric pressure and about 215° C. at 50 mm. pressure, and consisting predominantly of saturated aliphatic hydrocarbons, to form mixed alkyl chlorides, and conversion of a hydroxy aromatic compound of the type AH to a mixture of alkyl hydroxy aromatic compounds of the type AHR by a process including reaction thereof with resulting mixed alkyl chlorides; A representing an aromatic nucleus of the benzene series, H representing a nuclear hydroxyl group, and R representing an alkyl group.

10. A mixture of alkyl phenols of the type

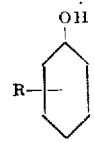

(R representing an alkyl hydrocarbon group containing at least 12 carbon atoms and derivable by chlorination of a kerosene fraction of petroleum distillate), said mixture containing a plurality of related alkyl phenols of said type which differ from each other in the alkyl hydrocarbon group represented by R.

11. A mixture of alkyl phenols that contains as a nuclear substituent a single alkyl group containing at least 12 carbon atoms and derivable by chlorination of a kerosene fraction of petroleum distillate and condensation of a mixture of resulting alkyl chlorides with a phenol of the benzene series, said alkyl phenol mixture containing a plurality of related alkyl phenols which differ from each other in the alkyl groups.

12. A mixture of monoalkyl monohydroxy benzenes that differ from each other in the alkyl groups, which alkyl groups correspond with the aliphatic hydrocarbons of a petroleum distillate boiling within the range about 215° C. at atmospheric pressure and about 260° C. at 50 mm. pressure.

13. A process for the preparation of an alkyl hydroxy aromatic compound which comprises halogenating a petroleum distillate consisting predominantly of saturated aliphatic hydrocarbons containing at least 12 carbon atoms to form mixed alkyl halides, and condensing at least a portion of the resulting mixed alkyl halides with a hydroxy aromatic compound of the type AH; A representing an aromatic nucleus and H representing a nuclear hydroxyl group.

14. A process for the preparation of an alkyl hydroxy aromatic compound which comprises halogenating a petroleum distillate consisting predominantly of saturated aliphatic hydrocarbons containing from 12 to 35 carbon atoms per molecule, to form mixed alkyl halides, and condensing at least a portion of the resulting mixed alkyl halides with a hydroxy aromatic compound to form an alkyl hydroxy aromatic compound.

15. A process for the preparation of a mixture of alkyl hydroxy aromatic compounds which comprises halogenating a petroleum distillate consisting predominantly of saturated aliphatic hydrocarbons containing from 12 to 35 carbon atoms per molecule, to form mixed alkyl halides, and condensing the resulting mixed alkyl halides with a hydroxy aromatic compound of the type AH; A representing an aromatic nucleus and H representing a nuclear hydroxyl group.

16. A process for the preparation of a mixture of alkyl hydroxy aromatic compounds of the benzene series which comprises halogenating a petroleum distillate consisting predominantly of saturated aliphatic hydrocarbons containing from 12 to 35 carbon atoms per molecule, to form mixed alkyl halides, condensing at least a portion of the resulting mixed alkyl halides with a hydroxy aromatic compound of the benzene series, to form a mixture of alkyl hydroxy aromatic compounds of the benzene series, and recovering a mixture of said alkyl hydroxy aromatic compounds.

17. A process for the preparation of a mixture of alkyl hydroxy aromatic compounds of the benzene series which comprises chlorinating a petroleum distillate boiling for the most part within the range about 215° C. at atmospheric pressure and about 260° C. at 50 mm. pressure to form mixed alkyl chlorides, condensing at least a portion of the mixed alkyl chlorides with a hydroxy aromatic compound of the benzene series in the presence of zinc chloride to form a mixture of alkyl hydroxy aromatic compounds of the benzene series, and recovering a mixture of said alkyl hydroxy aromatic compounds.

18. A process for the preparation of a mixture of alkyl phenols which comprises chlorinating a petroleum distillate boiling for the most part within the range about 235° C. at atmospheric pressure and about 215° C. at 50 mm. pressure and consisting predominantly of saturated aliphatic hydrocarbons, to form mixed alkyl chlorides, condensing at least a portion of the mixed alkyl chlorides with phenol in the presence of anhydrous zinc chloride to form a mixture of alkyl phenols, and recovering a mixture of said alkyl phenols.

19. A process for the preparation of a mixture of alkyl hydroxy aromatic compounds which comprises chlorinating with the aid of light a petroleum distillate consisting predominantly of saturated aliphatic hydrocarbons containing at least 12 carbon atoms to form mixed alkyl chlorides, and condensing at least a portion of the resulting mixed alkyl chlorides with a hydroxy aromatic compound of the type AH; A representing an aromatic nucleus and H representing a nuclear hydroxyl group.

20. A process for the preparation of a mixture of alkyl hydroxy aromatic compounds which comprises chlorinating a petroleum distillate boiling for the most part within the range about 215° C. at atmospheric pressure and about 260° C. at 50 mm. pressure, continuing the chlorination until the amount of combined chlorine in the resulting product corresponds with 1.1 to 1.5 atoms of combined chlorine per molecule of petroleum hydrocarbon, and condensing at least a portion of the mixed alkyl chlorides with a hydroxy aromatic compound of the benzene series with the aid of a metal halide condensing agent.

21. A process for the preparation of a mixture of alkyl hydroxy aromatic compounds, which comprises chlorinating with the aid of light a Pennsylvania petroleum distillate which for the most part boils between about 215° C. at atmospheric pressure and about 260° C. at 50 mm. pressure, continuing the chlorination until the amount of combined chlorine in the resulting product corresponds with 1.1 to 1.15 atoms of combined chlorine per molecule of petroleum hydrocarbon, and condensing the resulting mixture of alkyl chlorides with a phenol of the benzene series with the aid of zinc chloride as a condensing agent.

22. A mixture of monoalkyl monohydroxy benzenes that differ from each other in the alkyl groups, which alkyl groups correspond with the aliphatic hydrocarbons of a kerosene fraction of Pennsylvania petroleum which boils from 235° to 240° C. at atmospheric pressure and are derivable by chlorination of such a kerosene.

23. A mixture of alkyl cresols that contain as a nuclear substituent a single higher alkyl group containing at least 12 carbon atoms and derivable by chlorination of a kerosene fraction of petroleum distillate and condensation of a mixture of resulting alkyl chlorides with a cresol, said alkyl cresol mixture containing a plurality of related alkyl cresols which differ from each other in said higher alkyl groups.

24. A mixture of alkyl cresols that contain as a nuclear substituent a single higher alkyl group, said alkyl cresol mixture containing a plurality of related alkyl cresols which differ from each other in said higher alkyl groups, said alkyl cresol mixture being derivable by chlorination of a kerosene boiling from about 195° to about 300° C. and boiling for the most part from 225° to 275° C., at atmospheric pressure, and containing about 5.6 per cent of unsaturated hydrocarbons, and condensation of the mixture of resulting alkyl chlorides with a cresol.

25. A mixture of alkyl para-cresols that contain as a nuclear substituent a single higher alkyl group, said alkyl para-cresol mixture containing a plurality of related alkyl para-cresols which differ from each other in said higher alkyl groups, said alkyl para-cresol mixture being derivable by chlorination of a kerosene boiling from about 195° to about 300° C. and boiling for the most part from 225° to 275° C., at atmospheric pressure, and containing about 5.6 per cent of unsaturated hydrocarbons, and condensation of the mixture of resulting alkyl chlorides with para-cresol.

26. A process for the preparation of a mixture of monoalkyl monohydroxy benzenes which comprises chlorinating a petroleum distillate boiling from 235° to 240° C. at atmospheric pressure, subjecting the reaction mixture to fractional distillation, collecting a middle fraction of the distillate comprising mainly monochlorinated hydrocarbons, and condensing said fraction of chlorinated hydrocarbons with phenol with the aid of zinc chloride as a condensing agent.

27. A process for the preparation of a mixture of alkyl hydroxy aromatic compounds which comprises chlorinating a kerosene boiling from 195° to 300° C. and boiling for the most part from 225° to 275° C., and containing about 5.6 per cent of unsaturated hydrocarbons, to produce a chlorination product containing mono-, di- and poly-chlorinated hydrocarbons, condensing the resulting chlorination product with a phenol of the benzene series in the presence of zinc chloride as a condensing agent to form a mixture of alkyl phenols, and recovering a mixture of said alkyl phenols.

28. A process for the preparation of a mixture of alkyl cresols which comprises chlorinating a petroleum distillate consisting predominantly of saturated aliphatic hydrocarbons containing at least 12 carbon atoms to form mixed alkyl chlorides, condensing at least a portion of the resulting mixed alkyl chlorides with a cresol, and recovering a mixture of said alkyl cresols.

29. A process for the preparation of a mixture of higher alkyl cresols which comprises chlorinating a kerosene boiling from 195° to 300° C. and boiling for the most part from 225° to 275° C., and containing about 5.6 per cent of unsaturated hydrocarbons, to produce a chlorination product containing mono-, di- and poly-chlorinated hydrocarbons, condensing the resulting chlorination product with a cresol in the presence of zinc chloride as a condensing agent, to form a mixture of higher alkyl cresols, and recovering a mixture of said higher alkyl cresols.

LAWRENCE H. FLETT.

CERTIFICATE OF CORRECTION.

Patent No. 2,178,571.    November 7, 1939.

LAWRENCE H. FLETT.

It is hereby certified that error appears in the printed specification of the above numbered patent requiring correction as follows: Page 1, second column, line 34, after "A." insert a parenthesis; page 4, second column, line 71, Example 14, for "oly" read oily; page 5, second column, line 36, Example 19, for "distillate (boiling" read distillate) boiling; line 47, same example, for "chloride" read chlorine; page 8, second column, line 47, claim 21, for "1.15" read 1.5; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal).

boiling for the most part from 225° to 275° C., at atmospheric pressure, and containing about 5.6 per cent of unsaturated hydrocarbons, and condensation of the mixture of resulting alkyl chlorides with a cresol.

25. A mixture of alkyl para-cresols that contain as a nuclear substituent a single higher alkyl group, said alkyl para-cresol mixture containing a plurality of related alkyl para-cresols which differ from each other in said higher alkyl groups, said alkyl para-cresol mixture being derivable by chlorination of a kerosene boiling from about 195° to about 300° C. and boiling for the most part from 225° to 275° C., at atmospheric pressure, and containing about 5.6 per cent of unsaturated hydrocarbons, and condensation of the mixture of resulting alkyl chlorides with para-cresol.

26. A process for the preparation of a mixture of monoalkyl monohydroxy benzenes which comprises chlorinating a petroleum distillate boiling from 235° to 240° C. at atmospheric pressure, subjecting the reaction mixture to fractional distillation, collecting a middle fraction of the distillate comprising mainly monochlorinated hydrocarbons, and condensing said fraction of chlorinated hydrocarbons with phenol with the aid of zinc chloride as a condensing agent.

27. A process for the preparation of a mixture of alkyl hydroxy aromatic compounds which comprises chlorinating a kerosene boiling from 195° to 300° C. and boiling for the most part from 225° to 275° C., and containing about 5.6 per cent of unsaturated hydrocarbons, to produce a chlorination product containing mono-, di- and poly-chlorinated hydrocarbons, condensing the resulting chlorination product with a phenol of the benzene series in the presence of zinc chloride as a condensing agent to form a mixture of alkyl phenols, and recovering a mixture of said alkyl phenols.

28. A process for the preparation of a mixture of alkyl cresols which comprises chlorinating a petroleum distillate consisting predominantly of saturated aliphatic hydrocarbons containing at least 12 carbon atoms to form mixed alkyl chlorides, condensing at least a portion of the resulting mixed alkyl chlorides with a cresol, and recovering a mixture of said alkyl cresols.

29. A process for the preparation of a mixture of higher alkyl cresols which comprises chlorinating a kerosene boiling from 195° to 300° C. and boiling for the most part from 225° to 275° C., and containing about 5.6 per cent of unsaturated hydrocarbons, to produce a chlorination product containing mono-, di- and poly-chlorinated hydrocarbons, condensing the resulting chlorination product with a cresol in the presence of zinc chloride as a condensing agent, to form a mixture of higher alkyl cresols, and recovering a mixture of said higher alkyl cresols.

LAWRENCE H. FLETT.

CERTIFICATE OF CORRECTION.

Patent No. 2,178,571.   November 7, 1939.

LAWRENCE H. FLETT.

It is hereby certified that error appears in the printed specification of the above numbered patent requiring correction as follows: Page 1, second column, line 34, after "A." insert a parenthesis; page 4, second column, line 71, Example 14, for "oly" read oily; page 5, second column, line 36, Example 19, for "distillate (boiling" read distillate) boiling; line 47, same example, for "chloride" read chlorine; page 8, second column, line 47, claim 21, for "1.15" read 1.5; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal).